United States Patent [19]
Gulick, Jr. et al.

[11] 3,897,918
[45] Aug. 5, 1975

[54] INTERFEROMETRIC ROLLING MISSILE BODY DECOUPLING GUIDANCE SYSTEM

[75] Inventors: Joseph F. Gulick, Jr., Clarksville; James E. Hanson, Ellicott City, both of Md.

[73] Assignee: The United States of America as represented by the Secretary of the Navy, Washington, D.C.

[22] Filed: Feb. 27, 1974

[21] Appl. No.: 446,259

[52] U.S. Cl. .............................. 244/3.19; 244/3.14
[51] Int. Cl.² ........................................ F42B 15/02
[58] Field of Search ............. 244/3.13, 3.14, 3.19

[56] References Cited
UNITED STATES PATENTS

| | | |
|---|---|---|
| 2,998,942 | 9/1961 | Kuck .................................. 244/3.19 |
| 3,181,813 | 5/1965 | Gulick, Jr. et al. ................. 244/3.19 |
| 3,215,368 | 11/1965 | Follin, Jr. et al. ................. 244/3.19 |
| 3,363,858 | 1/1968 | Dobbins et al. .................... 244/3.14 |
| 3,527,429 | 9/1970 | Hawes, Jr. et al. ................. 244/3.14 |
| 3,677,500 | 7/1972 | Brown et al. ....................... 244/3.13 |

*Primary Examiner*—Verlin R. Pendegrass

[57] ABSTRACT

A signal processing system for use on an interferometric rolling missile proportional guidance system is provided. The signal processor, upon receiving appropriate signals from antennae affixed to the missile airframe and from apparatus for measuring missile motion, subtracts airframe turning rates from the apparent target angle rates seen by the antennae in order to measure the true turning rate of a line-of-sight from the missile to the target.

10 Claims, 2 Drawing Figures

INTERFEROMETRIC ROLLING MISSILE BODY DECOUPLING GUIDANCE SYSTEM

BACKGROUND OF THE INVENTION

Conventional proportional navigation requires a measurement of a missile to target line-of-sight in inertial coordinates. To achieve intercept, some form of apparatus is then required to maintain the rate of change of the line-of-sight angle at zero (for a nonmaneuvering target). Use of an interferometer mounted on the missile will provide a signal indicating the relative bearing of the missile to target line-of-sight multiplied by an unknown constant. A gyroscope is used to provide a signal which indicates missile body motion with respect to some arbitrary reference line. If the difference between these two signals is taken and then differentiated, a measure of the missile to target line-of-sight rate of change in inertial space is obtained. A conventional guidance system further employs an autopilot and appropriate aerodynamics to close the control loop and to drive the line-of-sight rate of change to zero, thereby insuring an intercept course. In a conventional interferometer guidance system, there is no requirement to solve the interferometric ambiguities involved therein. This is because proportional navigation utilizes only the rate of change of the line-of-sight angle in inertial space and there is no requirement for actual target position information. However, in a system where the interferometer is used to point a secondary guidance system toward a target, the interferometric ambiguities must be either resolved or eliminated.

This type of missile guidance system is further complicated because decoupling of the missile body motion by use of a gyroscope must be achieved in a manner which insures that no body motion feed-through will occur in the event of a momentary loss of signal in the interferometer system. It has been found that if this body motion feed-through occurs it will cause almost instantaneous instability of the missile.

It is therefore an object of the present invention to provide a signal processing system, for use on an interferometric rolling missile, to perform accurate and controllable subtraction of missile motion from a body-affixed interferometric antenna system.

It is another object of the present invention to provide a missile guidance signal processor such that, in the absence of an interferometric guidance signal, no body motion will be fed through to the missile steering system.

It is an object of the present invention to provide a missile guidance signal processor employing electronic devices to replace heavy, bulky, high powered, mechanical devices.

It is a further object of the present invention to provide a missile guidance signal processing system which effectively resolves all interferometric ambiguities.

It is still another object of the present invention to provide a missile guidance signal processing system having a phase memory sufficient to minimize transients associated with momentary loss of guidance signals.

SUMMARY OF THE INVENTION

The present invention involves electrical apparatus to provide accurate guidance signals in a radar homing guidance system for use on a rolling missile. More particularly, the invention involves a missile guidance system employing antennae affixed to the body of the missile airframe and having available for use a signal indicating airframe motion. The invention provides apparatus which acts to subtract airframe turning rates from the target angle rates seen by the antennae, thereby causing the missile to fly on a bearing sufficient to intercept the target. The signal indicative of airframe motion may be obtained by use of a gyroscope in combination with a potentiometer. The present invention resolves the interferometric ambiguity by maintaining a continuous measure of the phase relationship between the signals of the two antenna horns of the rolling airframe which is a function of the missile to target line-of-sight angle. Apparatus is provided which extracts the term containing the missile look angle information from the phasor (trigonometric) relationship and uses this angle term to produce a proportional guidance signal.

More particularly, an automatic phase control loop provides a carrier signal which is phase modulated in response to a signal from the gyroscope. The signals produced by the interferometer system are modulated by the carrier signal from the automatic phase control loop and produce a signal of amplitude proportional to the peak amplitude of a voltage induced at the interferometer antennae. The phase angle of the resultant signal is then the phase of the modulated carrier signal of the automatic phase control loop shifted by the phase angle of the interferometer output signal. The resulting magnitude of the phase modulation on the carrier signal at missile roll frequency is a measure of the missile to target line-of-sight angle. This signal is then fed to a second automatic phase control loop which removes the carrier and produces the tracking error signal at the missile roll frequency. The direct current (D.C.) voltage error associated with the initial roll condition of the missile when acquisition first occurs, is removed by filtering. The filtered signal is then used to form the missile steering signal and is also used to provide gyroscope torqueing signals.

DESCRIPTION OF THE PREFERRED EMBODIMENT

Figure 1:
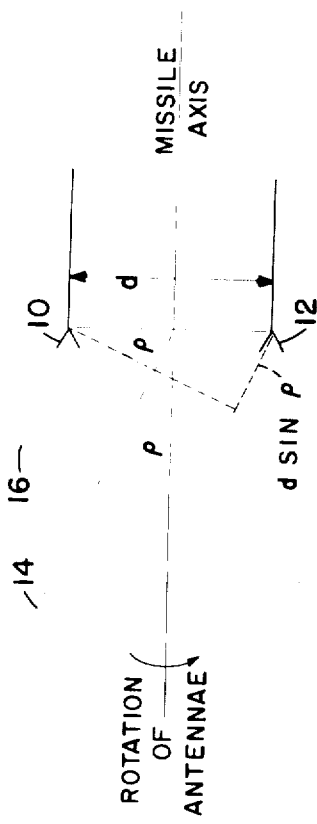
FIG. 1 is a diagram illustrating the geometry of a conventional two-port radar interferometer.

FIG. 1 shows a diagrammatical representation of a two-port interferometer which can provide a measurement of electromagnetic wave interference. Two antenna horns or ports; 10 and 12, are mounted on the forward end of a missile or the like and are separated by some distance $d$. These antennae operate to receive electromagnetic energy which is being generated or reflected by a target lying at some point along a line-of-sight line 14. If the target is at a distance which is greater than $2d^2/\lambda$ (where $\lambda$ is the wavelength of the electromagnetic energy) then the incoming electromagnetic energy can be assumed to be a plane wave. Actually, this incoming energy wave is spherical in shape. The incoming phase front of this plane wave is shown at 16. As can be seen the phase front 16 must travel a longer distance to reach the bottom antenna horn 12 than to reach the top antenna horn 10. This distance differential can be shown to be $d \sin p$. Assuming a propagation velocity of the speed of light (c), the signal received at antenna horn 12 will lag in time the signal received at antenna horn 10 by a time given by:

$$\tau_d = d \sin \rho / c \qquad (1)$$

If the frequency of the incoming phase front 16 is taken to be $f_{RF}$, then the phase shift of the signal at antenna horn 12 relative to the signal at antenna horn 10 is given by:

$$\phi_\rho = 2\pi f_{RF} \tau_d = (2\pi f_{RF}/c)(d \sin \rho) = (2\pi d/\lambda)(\sin \rho) \qquad (2)$$

This equation (2) shows that the phase shift is dependent upon the angle $\rho$, the variable which must be known for this method of missile guidance.

When the interferometer antennae horns 10 and 12 are caused to roll about the missile axis, this phase shift will vary. If the antennae horns 10 and 12 are rotated, about the missile axis, 90° from the position shown, it can be seen that the incoming phase front 16 will reach the antennae horns 10 and 12 at the same time, and no phase shift will result. Upon the occurrence of 180° of rotation, it can be seen that the incoming phase front 16 will reach antenna horn 12 before it reaches antenna horn 10. The amount of phase shift caused by this will also be given by $\phi_\rho$ as in equation (2).

The function which describes this phase shift variation caused by the missile roll can be shown to be:

$$\phi_{\rho R} = (2\pi d/\lambda) \sin \rho \cdot \cos \omega_R t \qquad (3)$$

where $\omega_R$ is the frequency of rotation in radians, which may be referred to as roll frequency.

Using the missile axis as a reference and the expression of equation (3) the signals received at the two antennae horns 10 and 12 can be shown to be:

$$\text{Horn } 10 = AG_1 \cos(2\pi f_{RF} t + \phi_{\rho R}/2) \qquad (4)$$

$$\text{Horn } 12 = AG_2 \cos(2\pi f_{RF} t - \phi_{\rho R}/2) \qquad (5)$$

where A is the amplitude of the incoming phase front 16; and $G_1$ is the gain of antenna horn 10 and $G_2$ is the gain of antenna horn 12. These two expressions, (4) and (5), show that a rolling interferometer permits measurement of the angle $\rho$, irrespective of the plane in which that angle lies. This is true because during a complete roll cycle the two antennae horns 10 and 12 look at all planes of the incoming electromagnetic energy wave 16.

Figure 2:
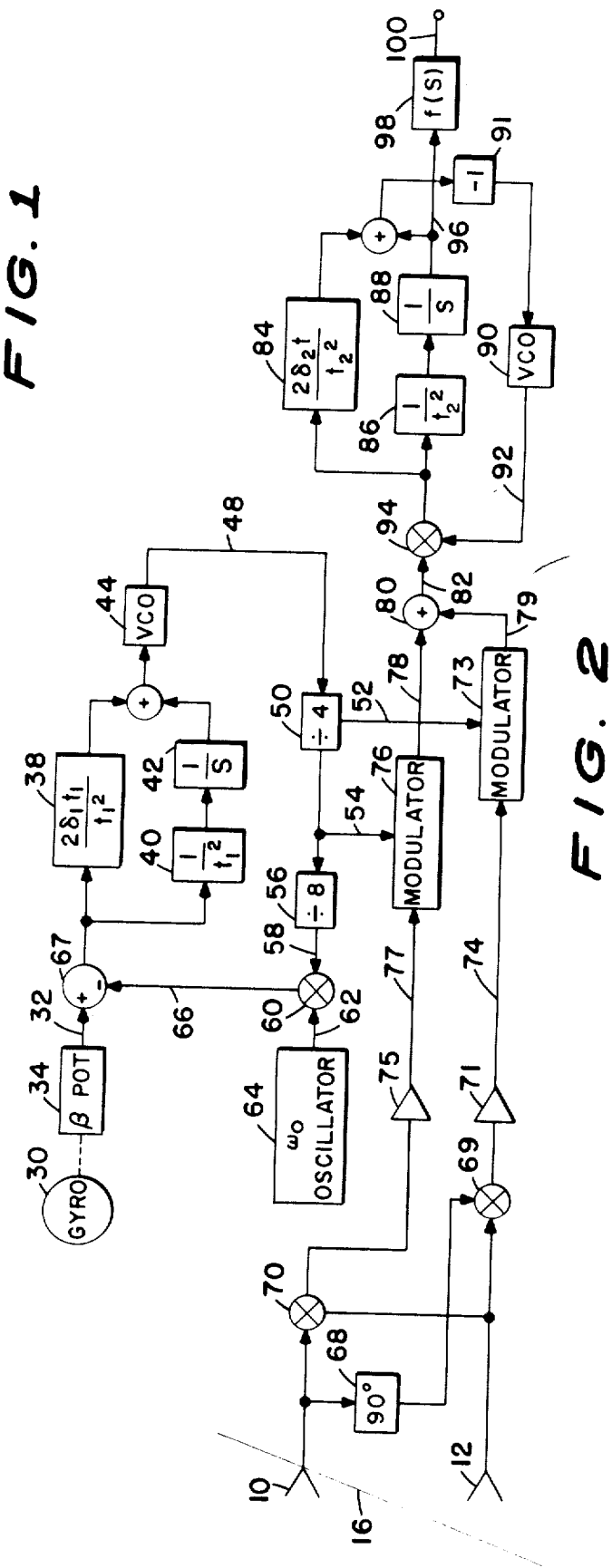
FIG. 2 is a block diagram of the preferred embodiment of the present invention.

Referring now to FIG. 2, the present invention is shown in block diagram form. Missile motion is sensed by a gyro 30 and an output signal on line 32 is obtained by use of a potentiometer 34 mounted on a gimbal of the gyro 30. An automatic phase control loop is employed to provide a carrier signal, with phase $\phi_g$, that can be phase modulated $\pm 4\pi$ radians in response to the signal on line 32 derived from the gyro 30. This automatic phase control loop utilizes an amplifier 38, a driver 40, an integrator 42, and a voltage controlled oscillator 44. The integrator 42 is used to compensate for any offset from zero operating frequency which might be produced by the voltage controlled oscillator 44. Since the signal on line 32, which is proportional to $\phi_g$, is derived from a gyro, it will be relatively noise free, and hence will allow this automatic phase control loop to have a rapid response. This being the case, the integrator 42 may not be necessary, since the loop may rapidly compensate for any zero frequency offsets. The dominant term of the signal $\phi_g$ expressed as equivalent phase, is equal to $2\pi d/\lambda$ times the sine of the gyro look (at the target) angle $\psi$ times a sinusoid with unit amplitude at the missile roll frequency $\omega_r$.

$$\phi_g = (2\pi d/\lambda)\sin \psi \cdot \sin \omega_r t \qquad (6)$$

where $d$ is the spacing of the interferometer antenna horns and $\lambda$ is wavelength of the received radiation.

In a typical automatic phase control loop, the output signal on line 48 of the voltage controlled oscillator 44 is the feedback signal required to perform the phase control function. However, in the present invention, since it is desired to have two output signals in quadrature with each other, the signal on line 48 is fed to a divide-by-four frequency divider 50. This divide-by-four frequency divider 50 provides a convenient method of obtaining the two desired signals in quadrature having phase $\phi_g$ relative to the carrier signal of frequency $8\omega_0$. The signals on lines 52 and 54 then, are the outputs of the first automatic phase control loop. The output signal of the divide-by-four frequency divider 50 on line 54 is also fed to a divide-by-eight frequency divider 56. This frequency division of the signal on line 54 is introduced to provide a system such that $\phi_g$ will vary between plus or minus four pi radians:

$$-4\pi < \phi_g < +4\pi \qquad (7)$$

The output signal from the divide-by-eight frequency divider 56 is fed on line 58 to a linear mixer 60. A second input to the linear mixer 60 is provided on line 62 by an oscillator 64 which supplies the basic carrier frequency $\omega_0$. The signals on lines 58 and 62 are then processed by the linear mixer 60 to form a linear signal on line 66. The linear signal on line 66 is then subtracted from the missile motion signal on line 32 in a conventional summing junction 67, thereby closing the first automatic phase control loop. The division by eight and the use of a linear phase comparator for phase between $-\pi/2$ and $+\pi/2$ provide continuous tracking of the phase $\phi_g$ over $\pm 4\pi$ radians.

A signal received by antenna horn 10 is fed to a phase shifter 68 where it is shifted 90° and combined in a mixer 69 with a signal received by antenna horn 12. The signal received by antenna horn 12 is combined in a mixer 70 with an unshifted signal received by antenna horn 10. Mixer 69 produces a combined signal which is amplified by amplifier 71 and fed to modulator 73 on line 74. Similarly, mixer 70 produces a signal which is amplified by amplifier 75 and fed to modulator 76 on line 77. The signal on line 77 is given by $AG_1 \sin \phi_\rho$, and the signal on line 74 is given by $AG_2 \cos \phi_\rho$, where A, $G_1$, $G_2$ and $\phi_\rho$ are the values as derived in the discussion of FIG. 1 and equations (2), (4) and (5).

It should be noted that the phase $\phi_\rho$ and the phase of signal $\phi_g$, relative to the missile roll, are not, in general, the same. However, even if the phase of these two signals is the same the carrier signal provided by the oscillator 64, will still be present.

The signal on line 77, $AG_1 \sin \phi_\rho$ is modulated with an output signal, on line 54, of the first automatic phase control loop, in a conventional modulator or mixer 76 which produces an output signal on line 78. Similarly, the signal on line 74, $AG_2 \cos \phi_\rho$, is modulated with the remaining output signal on line 52 using a second conventional modulator or mixer 73 which produces a modulated output signal on line 79. The signals on lines 78 and 79 are added in a summer 80 to produce a signal on line 82 having an amplitude proportional to $AG_1G_2$. The phase of the signal on line 82 is actually the phase of the first automatic phase control loop carrier signal shifted by the angle $\phi_\rho$. At this point it may be seen that two of the previously mentioned requirements have been met. Specifically, since the addition or subtraction of phase from the interferometer signal is independent of signal amplitude, this allows accurate and controllable subtraction of missile motion from the body-affixed antenna system. Also, since the amplitude of the output drops to zero when the interferometer input disappears, there will be no body motion feed-through to the steering system in the absence of an interferometer signal.

Recognizing that the interferometric ambiguities lie in the direct current (D.C.) part of the $\phi_a - \phi_p$ signal on line 82, while the tracking and steering information lies in the alternating current (A.C.) part of that signal at the missile roll frequency $\omega_r$; the task of the remaining portion of the invention is to extract the required information at the missile roll frequency $\omega_r$. The second automatic phase control loop is of the conventional type, and also employs an amplifier 84, a driver 86, an integrator 88, and a voltage controlled oscillator 90. A sign inverter 91 is also employed to produce the negative feedback which is required for all feedback loop stability. The output signal on line 92 of the voltage controlled oscillator 90 is fed back to a mixer 94 which mixes it with the signal on line 82 and thereby closes the second automatic phase control loop. The output signal of the integrator 88 on line 96 is fed to a filter 98, whose operation is best described by a transfer function $f(s)$. The output signal of this filter 98 on line 100 is then the desired system tracking and steering information. It is also possible to utilize the output signal of amplifier 84 to develop the desired output signal. When this second automatic phase control loop reaches a steady state condition, the signal on line 96 will be related to $\phi_a - \phi_p$ by the expression:

$$[(\dot{\phi}_a - \dot{\phi}_p)/1 + 2\zeta_2 t_2 S + t_2^2 S^2] + K \qquad (8)$$

where K is a constant dependent upon the offset from $8\omega_0$ of the zero input frequency of the voltage controlled oscillator 90. Further, if $t_2$ is chosen sufficiently small and if $\zeta$ equals 0.7, then the signal on line 96 can be made to reproduce $\dot{\phi}_a - \dot{\phi}_p$ with fidelity in the neighborhood of the missile roll frequency $\omega_r$.

The filter 98 must be chosen to block direct current (D.C.) and also to act as an integrator to solve for $\phi_a - \phi_p$ at $\omega_r$. The simplest expression for the filter would be given by S divided by a quadratic.

The output signal of the system on line 100 is now the tracking error signal at the missile roll frequency and is then available to form the steering signal and gyro torquing signal. In the event that the input signal to the second automatic phase control loop, on line 82, goes to zero, the integrator 88 will maintain the voltage controlled oscillator 90 frequency at its last value. In this manner, the phase of the voltage controlled oscillator output signal, on line 92, becomes a velocity predicted value of $\phi_a - \phi_p$. If this input signal on line 82 is not lost for a time which constitutes too large a fraction of the roll period, reacquisition of the signal will be accomplished without lobe jumping, even if the gyro has not yet slewed over to the target direction.

It should be understood that the details of the foregoing embodiment are set forth by way of example only. The final signal filter may be as complex as the desired results dictate. Accordingly, it is contemplated that this invention not be limited by the particular details of the embodiment as shown, except as defined in the appended claims.

What is claimed is:

1. A signal processor for use in a missile guidance system utilizing missile motion sensing means producing a signal representing missile motion in inertial space and interferometer means for producing signals representing an angle formed by a reference line and a line between said missile and a target, said signal processor comprising:

means for producing a carrier frequency output signal, means connected to receive said signal representing missile motion and said carrier frequency output signal for phase modulating said carrier frequency output signal with said signal representing missile motion to produce a phase modulated carrier signal, phase shifting means connected to receive said phase modulated carrier signal for producing first and second output signals displaced in phase quadrature relative to one another, first modulating means connected to receive a first output signal from said interferometer means and said first output signal from said phase shifting means for producing an output signal having the phase of said first signal from said interferometer shifted by the phase of said first output signal from said phase shifting means, second modulating means connected to receive a second output signal from said interferometer means and said second output signal from said phase shifting means for producing an output signal having a phase of said second signal from said interferometer shifted by the phase of said second output signal from said phase shifting means, signal combining means connected to receive said output signals from said first and second modulating means for producing a combined output signal representing said carrier frequency displaced in phase by an amount equal to the difference between the phase of said first and second interferometer signals and the phase of said missile motion modulated carrier signal, means connected to receive said combined output signal for extracting the phase modulation from said combined output signal and producing an output signal therefrom, and filter means connected to receive said extracted phase modulation signal for representing an output signal having all D.C. voltage components removed therefrom.

2. The apparatus of claim 1 wherein said missile motion sensing means is a gyroscope in combination with a potentiometer and said means for producing a phase modulated signal comprises an automatic phase control loop.

3. The apparatus of claim 2 wherein said means for extracting the phase modulation comprises an automatic phase control loop.

4. The apparatus of claim 3 wherein said filter means for removing all D.C. voltage components acts as an integrator at said missile roll frequency and has a transfer function given by S divided by a quadratic equation, where S is the LaPlace operator.

5. The apparatus of claim 4 wherein said phase shifting means comprises divide-by-four frequency divider means.

6. The apparatus of claim 5 wherein said automatic phase control loop for extracting the phase modulation comprises amplifier means connected in parallel with integrator means producing a signal connected to voltage controlled oscillator means for producing a feedback signal of said phase control loop.

7. In a guidance system for steering a missile to a point of collision with a target, said system including a rolling interferometer producing first and second signals having a phase relationship representing an angle formed by a line between said missile and said target and a reference line, and a gyroscope producing an output signal representing angular motion of said missile;

means for receiving said gyroscope output signal for producing first and second carrier signals phase modulated by said gyroscope signal and being displaced in phase quadrature relative to one another, modulator means connected to receive said first and second signals from said interferometer and said first and second phase modulated carrier signals for producing an output signal of frequency equal to said carrier signal frequency and having phase modulation representing the difference between said interferometer phase relationship and the phase of said gyroscope signal, means connected to receive said output signal from said modulator means for extracting the phase modulation components from said received signal and producing an output signal therefrom, and filter means connected to remove all D.C. voltage components from said extracted signal.

8. The apparatus of claim 7 wherein said means for receiving said gyroscope output signal comprises, oscillator means for producing a carrier frequency output signal, and an automatic phase control loop in combination with phase shifting means said loop connected to receive said carrier frequency output signal and said gyroscope output signal.

9. The apparatus of claim 8 wherein said automatic phase control loop comprises, amplifier means connected in parallel with integrator means for producing a signal connected to voltage controlled oscillator means for producing said phase control loop feedback signal.

10. The apparatus of claim 9 wherein said means for extracting said phase modulation component comprises an automatic phase control loop containing integrator means and voltage controlled oscillator means therein.

* * * * *